Aug. 3, 1926.

H. M. OKANO 1,594,552

GENERATOR PROTECTING DEVICE

Filed Oct. 21, 1925

Inventor

H. M. Okano

By Clarence A. O'Brien

Attorney

Patented Aug. 3, 1926.

1,594,552

UNITED STATES PATENT OFFICE.

HAROLD M. OKANO, OF EL CENTRO, CALIFORNIA.

GENERATOR-PROTECTING DEVICE.

Application filed October 21, 1925. Serial No. 64,043.

This invention relates to protecting devices for generators to preventing burning out of the same through continuous running or operation of the generator with the circuit thereto open.

It is well known in the art that the average direct current generator of the types in present use in motor vehicles for supplying current to charge the battery and operate the electrical system of said vehicle, will overheat when operated on an open circuit, and as a result of such overheating the insulation will be broken down and the circuit connection with the generator short circuited.

An object of this invention resides in providing a protecting device for generators operable primarily upon the starting of a generator to connect the same into a closed power supply circuit and operable secondarily upon said power supply circuit being opened to connect said generator to a grounded or return circuit connection to close the circuit across the terminals of the generator and thereby prevent the same from running on an open circuit.

A further object of the invention resides in providing a generator protecting device which will operate automatically through the current flow in the output circuit of a generator for maintaining the circuit closed to a power supply line or to a return connection to the generator when the power supply line or circuit is open.

The invention comprehends other objects and improvements in the details of construction and arrangement of the parts which are more particularly pointed out in the following description and in the claims directed to a preferred embodiment of the invention, it being understood, however, that various changes in the manner of constructing the device may be made for carrying out the invention without departing from the spirit and scope thereof as herein set forth.

In the drawing forming part of this application:—

Figure 2:
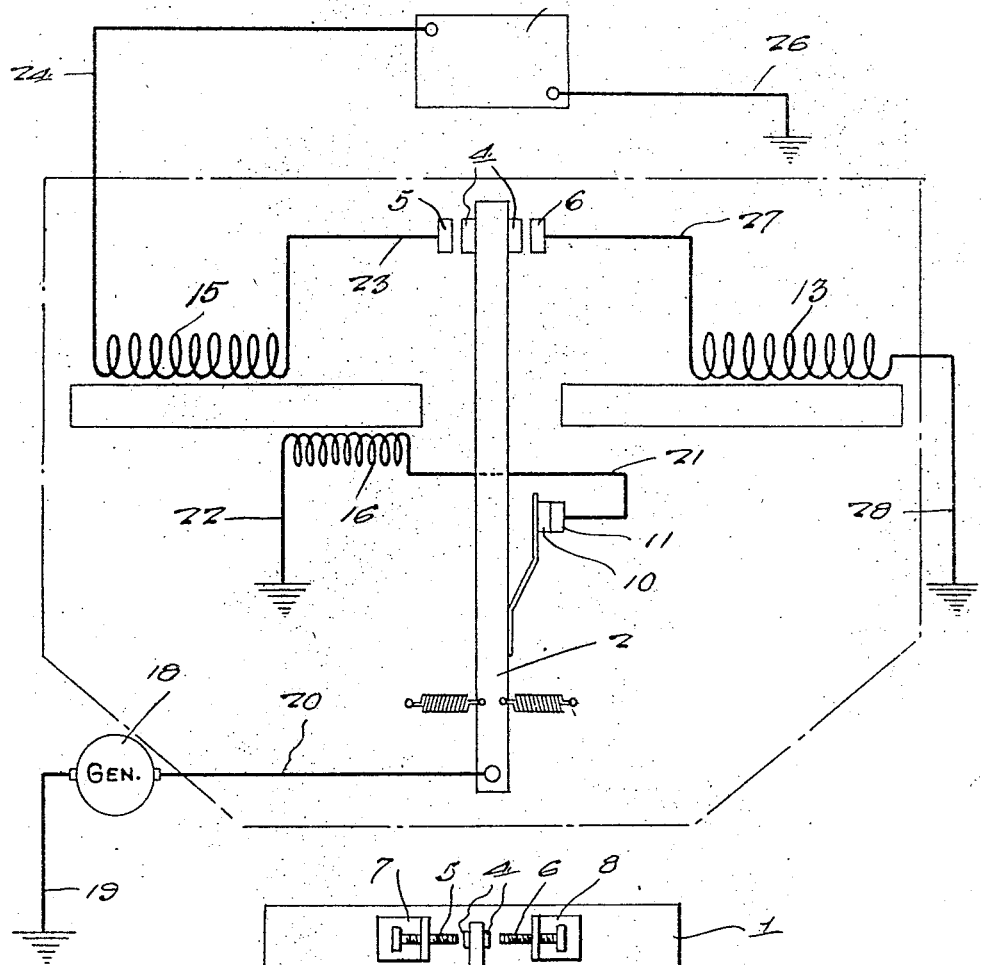
Fig. 2 is a diagrammatic view showing the circuit connection of the protecting device with the generator and the power output circuit.

A suitable base is indicated at 1 on which is pivotally mounted the armature 2 at one end thereof on a suitable pivot 3 while the opposite end is provided with a pair of contact points 4 adapted to engage the adjustable stationary contacts 5 and 6 respectively mounted in the brackets 7 and 8 respectively secured to the base 1. A spring strip 9 is mounted in the central portion of the armature and carries the contact point 10 adapted for engagement with the adjustable stationary contact 11 carried in the supporting bracket 12 also mounted on the base 1.

An electro-magnet 13 is suitably mounted on the base 1 and positioned so that its core 14 will direct the magnetic field thereof for operation on the armature 2, which magnet is placed in the generator return circuit and is adapted to be energized upon the engagement of the contacts 4 and 6 for maintaining the armature in position to close the said contacts and close the return circuit of the generator when the power circuit thereof is opened.

An electro-magnet 15 has an operating coil 16 on the end thereof adjacent the armature which is adapted to primarily operate the armature upon the starting of the generator to close the circuit controlled by contacts 4 and 5 through the electro-magnet 15 forming part of the power supply circuit from the generator, so that upon the said power supply circuit being closed, the final energization of the electro-magnets 15 will maintain the power circuit closed so long as the generator is operated.

Figure 1:
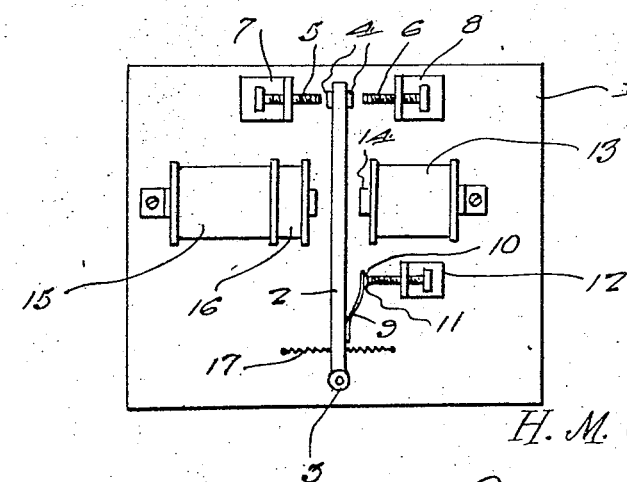
Figure 1 is a plan view of the protector.

Coiled springs 17 normally maintain the armature 2 in a central position as shown in Figs. 1 and 2 of the drawings in which position the contacts 10 and 11 close the circuit through the operating coil 16.

In order to thoroughly understand the operation of this generator protecting device, particular reference is made to Fig. 2 wherein the generator is indicated at 18 having a grounded return circuit 19 while the power circuit 20 is connected to the armature 2. Upon the starting of the generator with the parts as shown in Fig. 2, the circuit through the armature to the contacts 10 and 11 is closed, closing the circuit to the operating coil 16 through the wire 21 while the wire connection 22 extends from the coil 16 to the ground forming the return circuit. This energization of the coil 16 operates the armature 2 to move the contacts 4 into engagement with the contacts 5 for closing the circuit to the wires 23 connected with the electro-magnet 15, while this electro-magnet is further connected by the wire 24 to a power consuming device 25 which is connected by the wire 26 to the ground forming the return circuit. If this power consuming device is under operation and the power supply circuit is closed, the electro-magnet 15 will be energized and will maintain the armature in such position as to close the contacts 4 and 5 and maintain this power circuit in closed relation so long as the remaining portion of the circuit is closed and the power from the generator consumed.

Upon the opening for any reason of the power supply circuit, the electro-magnet 15 will become de-energized and the springs will return the armature to the normal position and in this return of the armature to the normal position, the same will be moved past the central point shown in Fig. 2. Upon engagement of the contact 10 with the contact 11, the coil 16 will then be again energized and the armature moved until these contacts 10 and 11 are disengaged, and contacts 4 and 5 momentarily engaged. Upon the failure of the circuit to close, the armature will vibrate, which vibration will through the resiliency of the spring strip 9, permit the contacts 4 to engage the contacts 6 closing the circuit to the electro-magnet 13 through the wires 27 and 28 to the ground forming the return circuit to the wire 19 and the generator. Upon the energization of this electro-magnet 13, the return circuit to the generator will be maintained in a closed condition so long as the operation of the generator continues, which will prevent the operation of the generator on an open circuit and also prevent the overheating thereof and consequently prevent damage as a result of such overheating.

Due to the contact points 10 and 11 being in engagement in the normal position of the armature 2, when the generator is not in operation, it will be readily appreciated that upon starting the generator the armature will be operated to close the circuit controlled by the contacts 4 and 5 in order that the power supply circuit will be closed upon the primary movement of the armature in preference to the return circuit to the generator.

It will thus be seen that the invention is entirely automatic in operation and controlled by the generator and the energization of the power supply circuit thereof.

Having thus described my invention, what I claim as new is:—

1. Means for protecting generators of the type used in motor vehicle power supply systems wherein the motor vehicle has a power supply circuit and the generator has an output circuit for connection therewith; comprising a protector unit having a circuit controlling member interposed between the output circuit of the generator and the power supply circuit normally operable to open said power supply circuit, an operating circuit having means operable for moving the member to close the power supply circuit with the output circuit of the generator, means operable to retain said member in position to connect the output circuit with the power supply circuit during continuous energization of said circuits, and electro-magnetic means energizable for operating the member to close the output circuit of the generator independent of said power supply circuit after de-energization of said power supply circuit, said last named means being operable after energization until de-energization of the generator.

2. A generator protector, comprising a movable armature in circuit with the generator normally retained in one position, an operating circuit closed in the normal position of the armature, an electro-magnet included in said operating circuit for moving the armature in one direction, a power supply circuit having an electro-magnet therein, said power supply circuit being energized through said armature in the position effected by said operating circuit, the electromagnet in said power supply circuit maintaining the armature out of its normal position and said power supply circuit energized as long as said circuit is closed, and a return circuit including an electro-magnet adapted for energization, following the de-energization of the power supply circuit, said return circuit being adapted to maintain the circuit through the generator closed automatically upon the de-energization of the power supply circuit.

In testimony whereof I affix my signature.

HAROLD M. OKANO.